United States Patent [19]

Elms

[11] 4,009,377
[45] Feb. 22, 1977

[54] POSITIONING DETERMINING METHOD AND APPARATUS

[76] Inventor: Ronald Duane Elms, 304 Orchard St., Chagrin Falls, Ohio 44022

[22] Filed: Nov. 7, 1975

[21] Appl. No.: 629,802

[52] U.S. Cl. .................. 235/151.32; 235/151.11; 318/603; 340/282

[51] Int. Cl.[2] ........................................ G06F 15/20

[58] Field of Search ............... 235/151.11, 151.32, 235/152; 340/206, 282; 318/601, 603

[56] References Cited

UNITED STATES PATENTS

| 3,665,280 | 5/1972 | Payne et al. | 235/151.11 X |
| 3,668,500 | 6/1972 | Kosem | 318/603 X |
| 3,676,652 | 7/1972 | Millis, Jr. et al. | 235/151.32 |

Primary Examiner—Jerry Smith
Attorney, Agent, or Firm—Thomas R. Vigil

[57] ABSTRACT

The method includes steps for and the apparatus includes means for determining the absolute position of a movable element mounted for movement along a path. The method includes the steps of: developing a pseudo random sequence of indicia which uniquely define the position of the movable element on the path; generating a pseudo random sequence of information bits which correspond to the indicia; reading the pattern of the N indicia at one particular position of the movable element on the path; cycling the generated pseudo random sequence until N bits thereof equal the pattern of N indicia at one particular position of the movable element on the path; and when equality is obtained, generating a logic signal indicating that the pseudo random sequence has been cycled to a position correlated to the absolute position of the movable element on the path. Preferably a counter is cycled in synchronism with the cycling of the pseudo random sequence so that when equality is obtained the counter will contain a number which is indicative of the absolute position of the movable element on the path. The apparatus includes electrical circuits for carrying out the method steps.

33 Claims, 10 Drawing Figures

POSITIONING DETERMINING METHOD AND APPARATUS

BACKGROUND OF THE INVENTION

1. Field of the Invention

The field of the invention is position determining methods and apparatus utilized in determining the position of a movable element mounted for movement on a path.

2. Description of the Prior Art

Heretofore various position determining devices have been proposed. Many of these devices include comparing circuits. Also numerous comparing circuits have been proposed for a variety of applications.

The previously proposed position determining devices usually have required a reference or starting point in order to determine the absolute position of a movable element on a path. Also such devices have not always been able to determine the direction of movement of the movable element. Examples of previously proposed position determining devices and electronic comparing circuits are disclosed in the following United States Patents:

2,765,459
2,808,650
2,885,613
3,064,889
3,268,713
3,582,924

As will be described in greater detail hereinafter the position determining method and apparatus of the present invention differ from the previously proposed methods and devices by providing for the determination of the absolute position of a movable element on a path without reference to a starting or reference point on the path. Also the method and apparatus can determine the direction of movement of the movable element. Additionally, the method includes the steps of and the apparatus includes circuitry for detecting whenever there is an error in the determination of the position of the movable element on the path and for making, thereafter, a new and correct determination of the position of the movable element on the path.

SUMMARY OF THE INVENTION

According to the invention there is provided a method for determining the absolute position of a movable element mounted for movement along a path, said method including the steps of: developing a pseudo random sequence of indicia which uniquely define the position of the movable element on the path; generating a pseudo random sequence of information bits which correspond to the indicia; reading the pattern of N indicia at one particular position of the movable element on the path; cycling the generated pseudo random sequence until N bits thereof equal the pattern of N indicia at one particular position of the movable element on the path; and when equality is obtained, generating a logic signal indiciating that the pseudo random sequence has been cycled to a position correlated to the absolute position of the movable element on the path.

Also according to the invention there is provided an apparatus for determining the absolute position of a movable element mounted for movement along a path, said apparatus including generating means for generating a pseudo random sequence of information bits, a scale associated with the movable element and the path and having indicia thereon related to particular positions along the path and corresponding to said pseudo random sequence of information bits, means associated with the movable element and the path for reading the indicia as the movable element moves along the path and for generating a signal which comprises a particular sequence of N information bits correlated to N indicia just read by said reading and generating means, comparing means coupled to said first generating means and to said reading and generating means for comparing N bits of said pseudo random sequence of information bits with said signal, and cycling means for cycling said pseudo random sequence of information bits in said generating means until equality is obtained in the comparison between said signal and an N bit portion of said pseudo random sequence of information bits in said generating means, said comparing means being operative when equality is obtained to generate a logic signal indicating that the position of said pseudo random sequence of information bits in said generating means is at a position correlated to the absolute position of the movable element on the path.

Further according to the invention there is provided a method for determining when a movable element has reached a predetermined position along a path, including the steps of: developing along the path a pseudo random sequence of indicia which uniquely define the position of the movable element on the path; memorizing N bits of a pseudo random sequence of information bits which corresponds to the pseudo random sequence of indicia, the N bits corresponding to and identifying a particular position along the path; reading the indicia as the movable element moves along the path; generating a changing signal which comprises N information bits correlated to the N indicia just read; comparing the memorized N bits with the changing signal; and, generating a logic signal when equality is obtained between the memorized N bits and the N indicia-generated bits, said logic signal indicating that the movable element is at a predetermined position on the path.

Still further according to the invention there is provided an apparatus for determining when a movable element has reached a predetermined position along a path, said apparatus comprising a memory, N bits of a pseudo random sequence of information bits being stored in said memory, a scale which is associated with the movable element and the path and which has a pseudo random sequence of indicia thereon corresponding to said pseudo random sequence of information bits, means associated with the movable element and the path for reading said indicia as the movable element moves along the path and for generating a changing signal which comprises N information bits correlated to the N indicia just read by said reading and generating means, and comparing means coupled to said memory and to said reading and generating means, said comparing means being operative to generate a logic signal when equality is reached between said N bits stored in said memory and the N bits received from said reading and generating means to indicate that the movable element is at the predetermined position on the path.

DESCRIPTION OF THE PREFERRED EMBODIMENT

Figure 1:
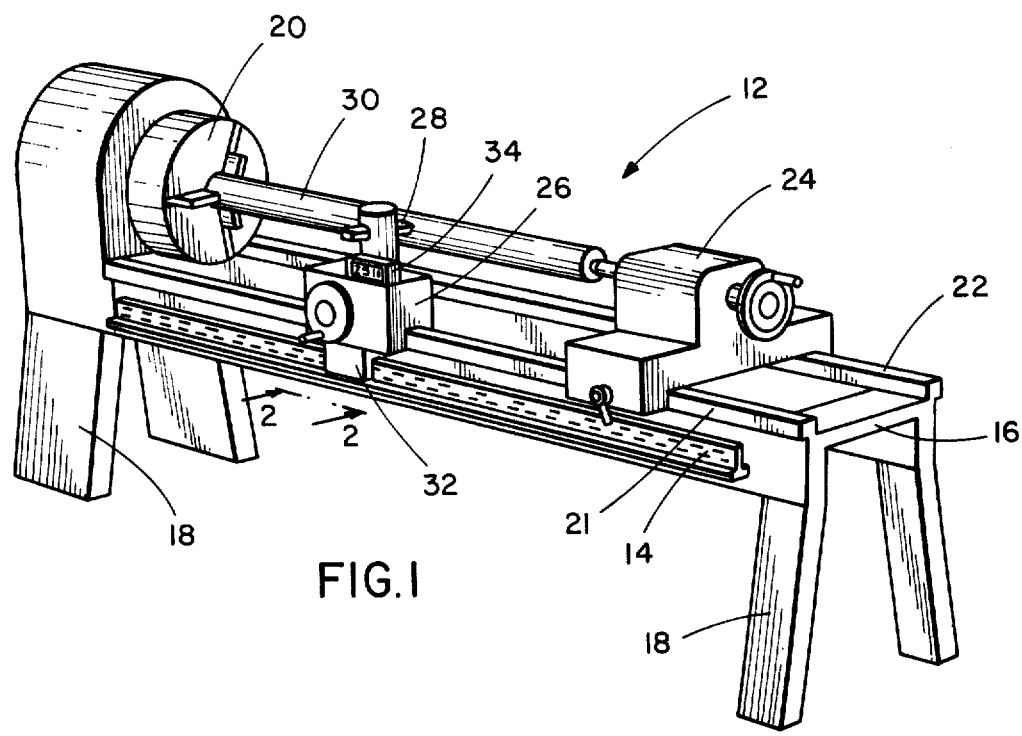
FIG. 1 is a perspective view of a machine tool utilizing the position determining apparatus of the present invention.

The method and apparatus of the present invention provide a novel approach to the problem of deriving absolute position information from a mechanical device which travels with a movable element mounted for movement along a path. The absolute position information can be fed to a visual display device or it can be fed to a control device for controlling the movement of the movable element.

The apparatus and method can be utilized in many environments, such as, for example, railway systems and machine tools. Also, the path can be linear or non-linear. Since the apparatus is particularly useful in the operation and/or control of machine tools, the apparatus, which is generally identified by reference numeral 10 in FIG. 8, will be described with reference to its use with a machine tool or lathe 12 illustrated in FIG. 1.

Figure 5:
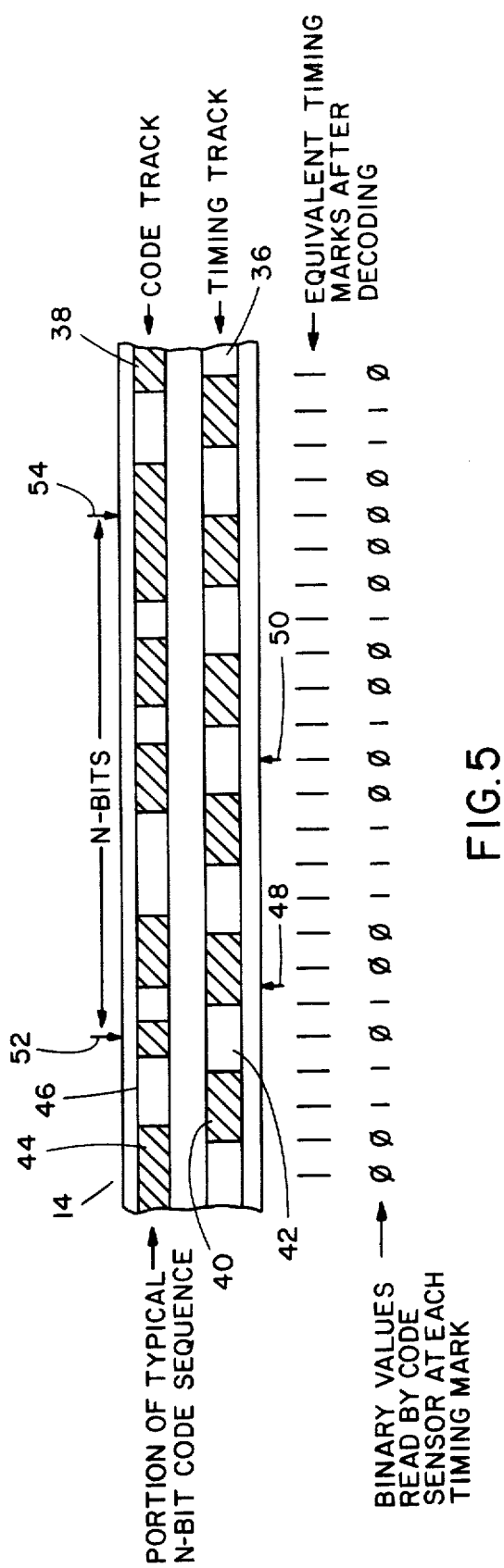
FIG. 5 is an enlarged fragmentary view of a portion of the scale indicia which are provided adjacent a path of movement of a movable element and which are utilized by the apparatus in determining the position of the movable element on the path.

The apparatus 10 includes, and utilizes, a unique scale 14 shown in FIGS. 1 and 5 and a pseudo random sequence of information bits. As will be described hereinafter in detail, utilization of the scale 14 and a pseudo random sequence by the apparatus 10 provides for a speedy and reliable determination of the absolute position of a movable element on a path without reference to the start or end point of the path. Also, these features, the scale 14 and the pseudo random sequence, facilitate the incorporation of circuitry in the apparatus 10 for determining when the position information is in error and for automatically making a new and correct determination of the absolute position of the movable element.

Referring to FIG. 1 the machine tool 10 includes a bed 16 mounted on supports 8. At one end of the bed 16 is a rotatable headstock or chuck 20 driven by a prime mover not shown. The bed has a pair of rails 21, 22 slidably and adjustably mounting a centering block or tailstock 24 at the other end of the bed. A movable element or toolpost 26 mounting a cutting tool 28 is mounted for movement on the rails 21, 22. A workpiece 30 is fixed in the headstock 20 and supported between the headstock 20 and the tailstock 24.

As the toolpost 26 moves along a linear path defined by the extent of the rails 21, 22 between the headstock 20 and the tailstock 24 and the tool 28 cuts into the workpiece 30, it is desirable to known exactly where the tool 28 is in relation to the workpiece 30 in order (a) to stop movement of the element on toolpost 26 at a particular precise position, (b) to cause the tool 28 to move inwardly or outwardly, or (c) to cause some other event or operation to take place. The apparatus 10 of the present invention provides means for making this determination of the exact position of the tool 28 relative to the workpiece 30 and includes the scale 14 mounted on the bed 16 and a sensing device 32 mounted to and depending from the toolpost 26 in position to travel along and over the scale 14. If desired, the apparatus 10 also can include a visual display device 34 mounted on the toolpost 26 as shown in FIG. 1 or mounted at some other location on or off the machine tool 12.

Referring now to FIG. 5, the scale 14 illustrated is a linear scale. Also, although the actual realization of the scale 14 may be achieved with different types of markings or indicia such as magnetic, mechanical, electrostatic or other detectable markings, the scale 14 illustrated herein utilizes optical detectable markings, namely light blocking and light passing segments hereinafter referred to as markings or indicia. These markings or indicia generate binary signals, i.e. a logic one or a "high" when light is passed and a logic zero or "low" when light is blocked.

According to the teachings of the present invention, the scale 14 includes two sets or tracks of detectable markings referred to herein as a timing track 36 and a code track 38. The set of markings forming the timing track 36 is simply a standard on-off pattern similar to patterns used in current linear incremental scales. The set of markings forming the code track 38 is generated or developed by a linear feedback code generator. The code is a pseudo random sequence of information bits having a basic code length of N bits. With the scale having the code track 38 of markings or indicia, any N consecutive indicia-generated bits provide a unique representation of the absolute position of those bits within the total length of the code. The code, of course, is directly correlated to incremental scale positions along the path of travel of the element 26. Thus, by reading N indicia-generated bits one can determine the absolute position where those bits appear on the scale.

Referring to FIG. 5, the markings of the timing track 36 include equal length, alternate segments of light blocking segments 40 and light passing segments 42. In FIGS. 1 and 5, these segments are shown much larger than they actually are in practice for the sake of clarity. The markings of the code track 38 also include light blocking segments 44 and light passing segments 46 which are, however, of unequal length.

Figure 3:
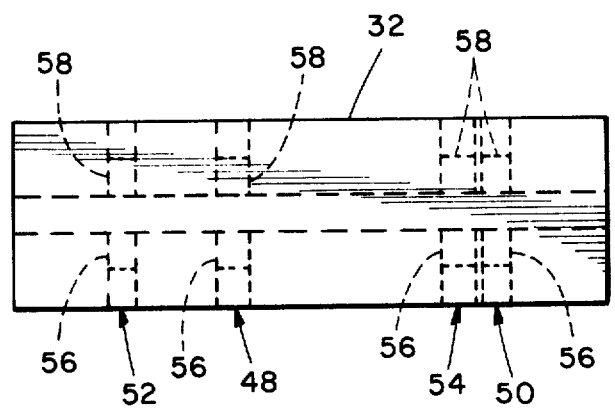
FIG. 3 is a top plan view of the sensing device shown in FIG. 2 and is taken along line 3—3 of FIG. 2.
Figure 2:
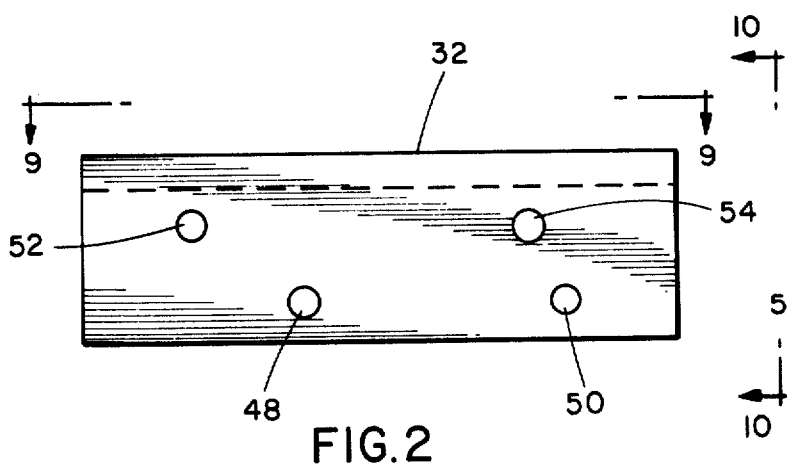
FIG. 2 is an enlarged side view of a sensing device utilized in the position determining apparatus associated with the machine tool of FIG. 1 and is taken along line 2—2 of FIG. 1.
Figure 4:
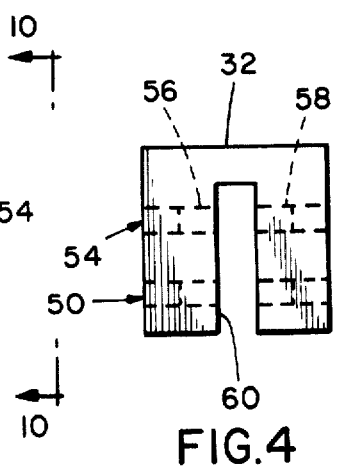
FIG. 4 is an end view of the sensing device shown in FIG. 2 and is taken along line 4—4 of FIG. 2.

Referring to FIGS. 2, 3 and 4, the sensing device 32 includes a pair of timing track sensors 48 and 50 and a pair of code track sensors 52 and 54. Each sensor 48—54 comprises a light emitting device 56 and a light sensing device 58. As shown, the sensing device 32 is generally rectangular or block shaped and has an elongate slot 60 therein. The slot 60 is received over the scale 14 and the light emitting devices 56 are positioned on one side of the slot 60 and the light sensing devices are situated in alignment with the light emitting devices 56 but on the opposite side of the slot 60 as best shown in FIGS. 3 and 4.

Each of the timing track sensors 48 and 50 will generate a signal when there is a transition from a light blocking segment 40 to a light passing segment 42 during the travel of the sensing device 32. Also, the sensors 48 and 50 are displaced from one another a distance such that when the sensor 48 is at the beginning of a cycle of segments 40 and 42, the sensor 50 is displaced 90° from one end of a cycle of segments 40 and 42, whereby a strobe signal is generated by one of the sensors 48, 50 each 90° of travel of the sensing device 32 through a cycle of the timing markings 40, 42. This is best understood from an examination of FIG. 5 where sensors 48 and 52 are represented by arrows and the equivalent timing marks or pulses, i.e. strobe signals, obtained after decoding as a result of one or the other of the sensors 48, 52 sensing a transition between a segment 40 and a segment 42 are shown beneath the timing track 36.

Each time a strobe signal is generated, the logic being read by one or the other of the code track sensors 52 and 54, i.e. the logic determined by the code marking 44 or 46 at that point in time or position of the sensing device 32 on the scale 14, is noted. If the marking consists of a light blocking segment 44, a "low" or logic zero signal ($\phi$) is noted; and if the marking consists of the light passing segment 46, a "high" or logic one signal (1) is noted. These binary values as read by the code track sensor at each timing mark are illustrated in FIG. 5.

Figure 6:
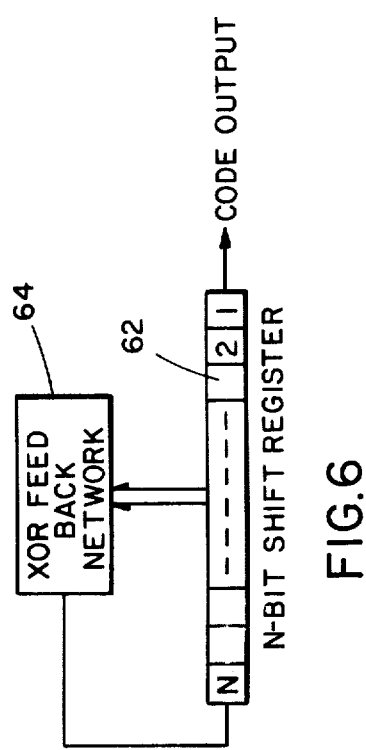
FIG. 6 is a schematic diagram of a pseudo random binary sequence code generator.

As stated above, two important elements utilized by the apparatus of the present invention are the scale 14 and a pseudo random sequence of information bits. More specifically, the apparatus utilizes a bi-directional pseudo random binary sequence generator. The basic form of a pseudo random binary sequence generator is known and is schematically illustrated in FIG. 6. Such a generator includes an N bit shift register 62 and an exclusive OR feedback network 64. In this generator the value of bit N at time $t+1$ is a function of the values of bits 1 through N at time $t$. Also the value of bit 1 at time $t-1$ can be expressed as a function of bits 1 through N at time $t$. Reversing the code generator to provide a bi-directional code generator is essentially the operation of going back in time and can be demonstrated as follows:

$$B_{N_{t+1}} = f(B_{1_t}) + f(B_{2_t}) \ldots + f(B_{N_t}) \quad (1)$$

$$B_{1_{t+1}} = B_{2_t} \quad (2)$$

$$B_{N-1_{t+1}} = B_{N_t} \quad (3)$$

With these relationships $B_{1_{t-1}}$ is derived as follows:

$$B_{N_t} = f_1(B_{1_{t-1}}) + f_2(B_{2_{t-1}}) + \ldots + f_N(B_{N_{t-1}}) \quad (4)$$

$$B_{1_{t-1}} = B_{1_t} = B_{3_{t-2}} \quad (5)$$

$$B_{N_t} = f_1(B_{1_{t-1}}) + f_2(B_{1_t}) + f_3(B_{2_t}) + \ldots + f_N(B_{N-1_t}) \quad (6)$$

The operator + is movable from one side of an equation to the other side, while maintaining parity. Accordingly, by re-arranging equation (6) one obtains $$f(B_{1_{t-1}}) + B_{N_t} + f(B_{1_t}) + f(B_{2_t}) + \ldots f(B_{N-1_t}) \quad (7)$$

Figure 7:
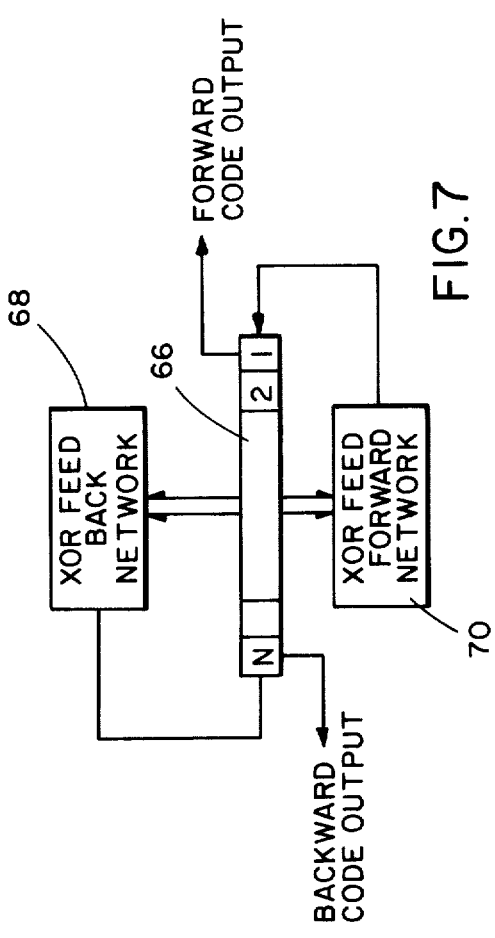
FIG. 7 is a schematic diagram of a bi-directional pseudo random binary sequence code generator.

This proves that a pseudo random binary sequence generator that runs in either direction can be constructed by utilizing a bi-directional shift register and an additional exclusive OR feedback network. Such a generator is shown in FIG. 7 and includes an N bit bi-directional shift register 66, an exclusive OR feedback network 68 and an exclusive OR feed forward network 70.

Figure 8:
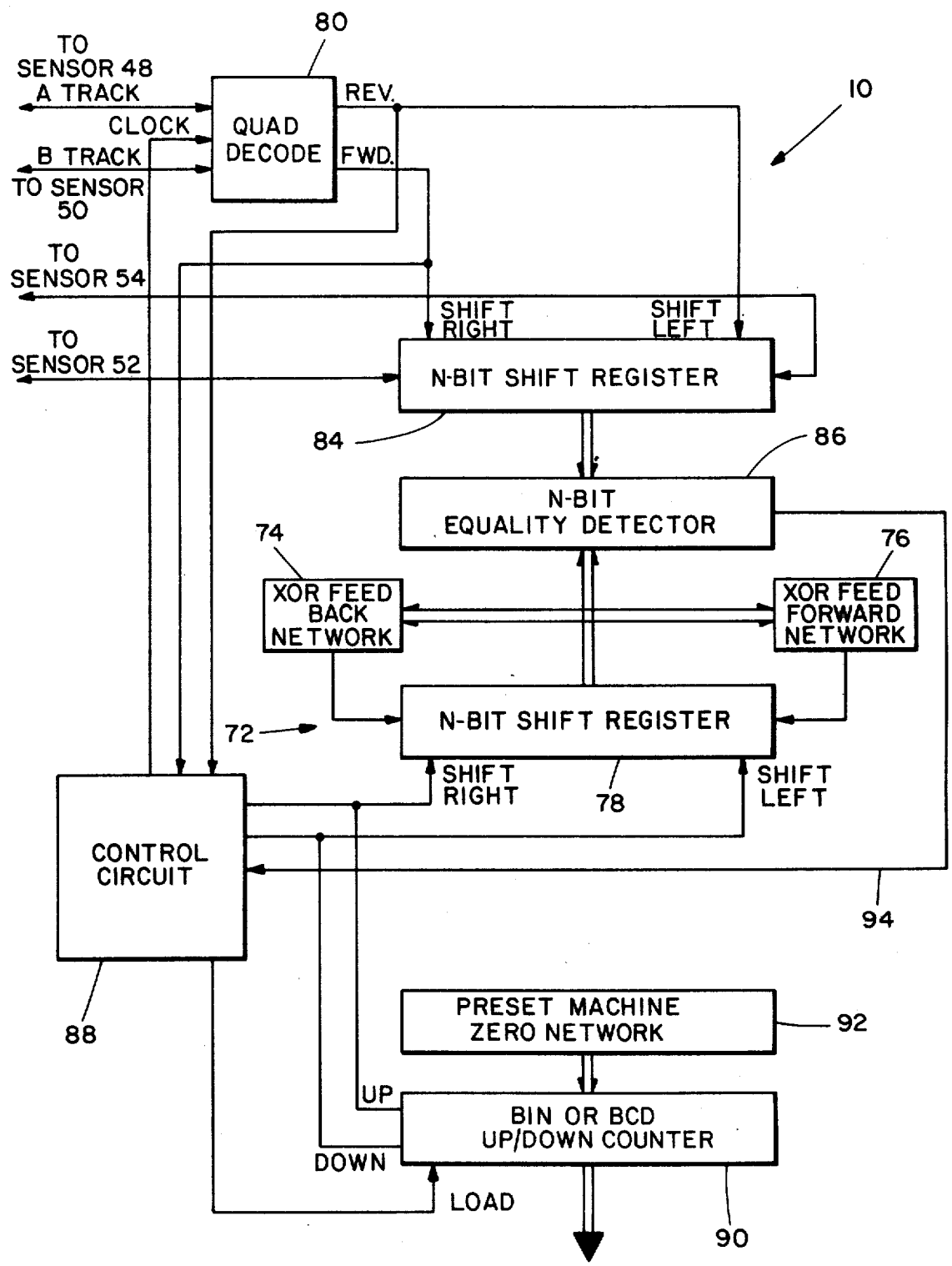
FIG. 8 is a schematic block circuit diagram of the position determining apparatus of the present invention.

The apparatus 10 shown in FIG. 8 includes such a bi-directional pseudo random sequence generator generally identified by the reference numeral 72. This generator 72 is only one realization of a bi-directional pseudo random sequence generator and includes an exclusive OR feedback network 74, an exclusive OR feed forward network 76 and an N bit shift register 78. The following table sets forth information regarding the connections required for various values of bit K to achieve maximum length codes using the feedback network 76.

| Bit length N | Feedback bit K | Feed forward bit K+1 |
|---|---|---|
| 10 | 3 | 4 |
| 11 | 2 | 3 |
| 15 | 1 | 2 |
| 17 | 3 | 4 |
| 18 | 7 | 8 |
| 20 | 3 | 4 |
| 21 | 2 | 3 |
| 22 | 1 | 2 |
| 23 | 5 | 6 |
| 25 | 3 | 4 |
| 28 | 3 | 4 |
| 31 | 3 | 4 |
| 33 | 13 | 14 |

Referring again to FIG. 5, as the sensing device 32 moves along the scale 14, the code track sensor 52 or 54 passing over the indicia or markings 44 and 46 will generate a signal comprising a portion of a pseudo random sequence of information bits identical to the pseudo random sequence generated by the generator 72. The positions of the code track sensors 52 and 54, when N=15, are represented by two arrows situated adjacent the code track 38. The code track sensor 52 is read when the element 26 is moving in the forward direction, e.g. toward headstock 20, and code track sensor 54 is read when the element 26 is moving in the rearward direction, e.g. toward the tailstock 24. Parenthetically, it should be noted that there is no requirement that the two tracks 36 and 38 by physically connected so long as the timing relationships illustrated in FIG. 5 are maintained. Further in this respect, it is to be noted that the segments 44 and 46 of the code tracks 38 are aligned with the segments 40 and 42 of timing track 36 in such a way that whenever a strobe or timing signal is generated, causing reading of the sensor 52 or 54, the marking or indicia being read off of the code track is definitely a light blocking segment 44 or definitely a light passing segment 46 and not a transition point between the light blocking segment and the light passing segment 46.

According to the teachings of the present invention the indicia or markings 44, 46 on the code track 38 correspond to a pseudo random sequence of information bits. As will be explained in detail hereinafter, the apparatus 10 will compare the last N indicia-generated bits generated as the sensing device 32 travels along the scale 14, with a pseudo random sequence cycled within the apparatus 10 until N bits of the pseudo random sequence equal the last N indicia-generated bits. When N bits of the pseudo random sequence being cycled in the apparatus 10 equal the N indicia-generated bits, a logic signal is generated indicating that the pseudo random sequence has been cycled to a position correlated to the absolute position of the movable element 26 on the path.

Referring now to Fig. 8, the apparatus 10 includes a quadrature decoder 80 coupled to an N bit shift register 84 which, in turn, is coupled to a comparator 86. The shift register 78 of the pseudo random sequence generator 72 is also coupled to the comparator 86. A control circuit 88 is coupled to the pseudo random sequence generator 72, the quadrature decoder 80 and the comparator 86 and also to an up/down counter 90. The control circuit 88 is operative to cycle the pseudo random sequence in the generator 72 and to step the counter 90 in synchronism with the cycling of the pseudo random sequence in the generator 72. The output signal from the counter is correlated to the absolute position of the element (toolpost) 26 on the path (rails 21, 22) by a preset machine zero network 92 coupled to the counter 90.

Briefly, the operation of the apparatus 10 is as follows: The timing signals from sensors 48 and 50 are applied to the quadrature decoder which will determine from the direction of the transitions causing the generation of the timimg signals whether the movable element 26 is moving in the forward or reverse direction. The manner in which the quadrature decoder determines forward or reverse movement from the direction of the transitions which generate the timing signals is explained in an article entitled "Fast Clock Helps Convert 2-Phase Encoder Signal to Positional Data" which appeared in Vol. 20 of "Electronic Design", Sept. 27, 1973. Simply, the logic state of the one sensor 48 as the sensor 52 goes from "high" to "low" or vice versa is indicative of the direction of movement. This direction timing information is transmitted to the shift register 84 to cause the same to shift the logic of the code track 36 being read by sensor 52 or 54 and appearing at the left or right input into the register. As indicated in FIG. 8, the sensor 52 is coupled to the left input of register 84 and the sensor 54 is coupled to the right input.

The control circuit 88 includes circuitry for cycling the generator 72 in a forward or reverse direction. The output of the quadrature decoder 80 is coupled to the control circuit 88 whereby the direction timing information is transmitted to the control circuit 88 to cause the same to cycle the pseudo random sequence through the generator 72 and simultaneously to step the counter 90 in the direction determined by the timing information. The cycling will only occur after N bits of indicia-generated information bits have been shifted into the shift register 84. As N bits of the pseudo random sequence are shifted into the register 78, they are simultaneously compared in the comparator 86 with the N indicia-generated information bits shifted into the register 84. When equality is reached, the comparator 86 generates a logic signal which is transmitted via conductor 94 to the control circuit 88 to stop the cycling of the pseudo random sequence in the generator 72 and simultaneously to stop the count in the counter 90. The output signal from the counter 90 now indicates the absolute position of the movable element 26.

Figure 9:
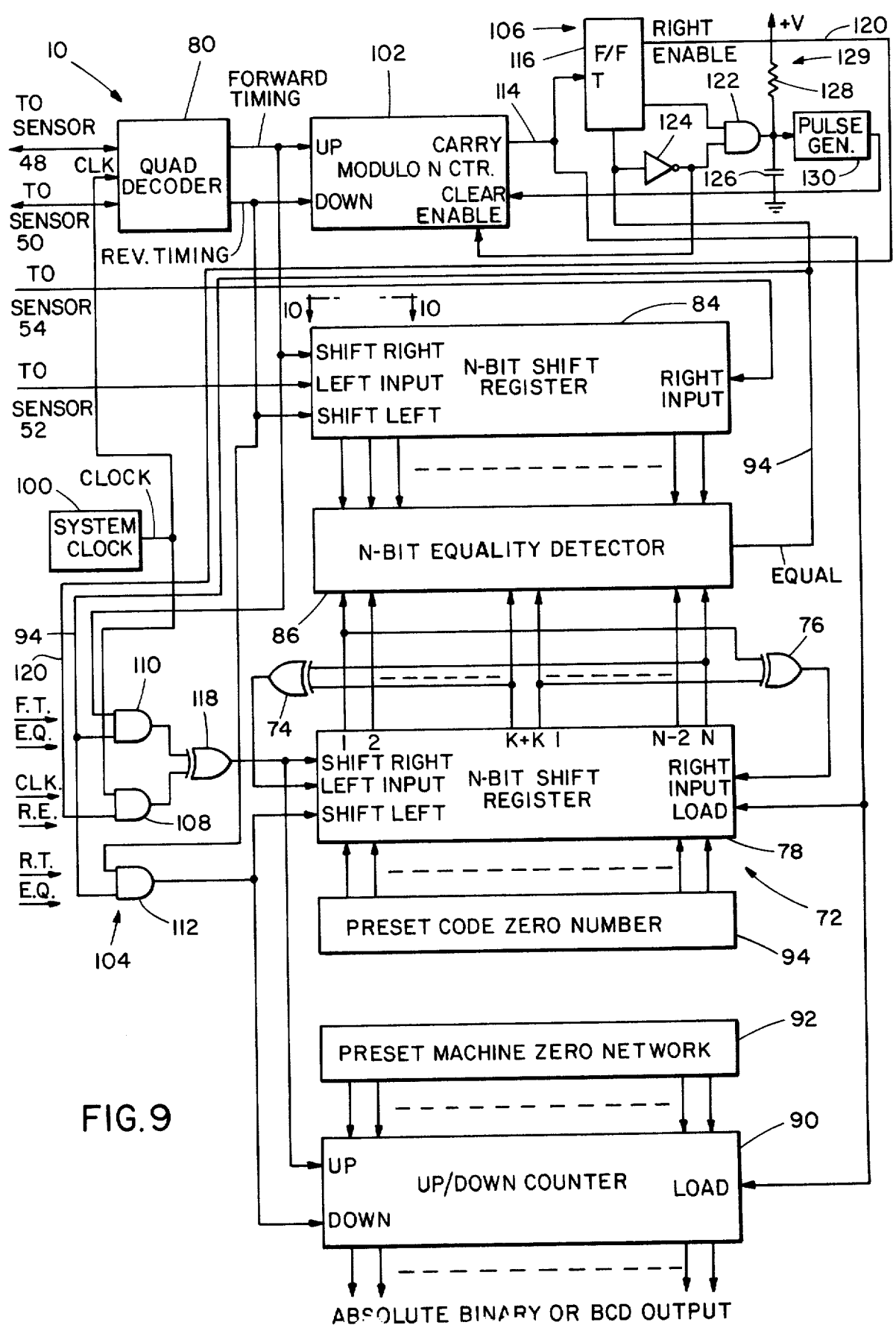
FIG. 9 is a more detailed schematic circuit diagram of the circuit shown in FIG. 8.

In FIG. 9 there is illustrated a more detailed schematic circuit diagram of the apparatus 10. More specifically, in FIG. 9 the components of the control circuit 88 and their connection to the other components of the apparatus 10 are illustrated. Also, the pseudo random sequence generator 72 is shown as including a pre-set code zero network 94 coupled to the shift register 78 in the manner indicated. The control circuit 88 includes a system clock 100, a modulo N counter 102, gating circuitry 104 and a lost-sync circuit 106. The system clock is connected to the input to the quadrature decoder 80 and to one AND gate 108 of the gating circuitry 104. The forward timing and reverse timing outputs of the quadrature decoder 80 are connected to the modulo N counter 102, the shift register 84 and the gating circuitry 104. More specifically, the forward timing output is connected to an AND gate 110 and the reverse timing output is connected to an AND gate 112 of the gating circuitry 104. Also, as shown, the forward timing output is connected to the shift right input of the shift register 84 and the reverse timing output is connected to the shift left input of the shift register 84.

An output 114 of the modulo N counter 102 is applied to the toggle input of a flip flop 116 in the lost-sync circuit 106. The output 114 is also connected to the load input of the shift register 78 and the load input of the counter 90. The output of the comparator 86 is connected via the conductor 94 to one input of the flip flop 116 and to one of the inputs of each one of the AND gates 110 and 112. In addition to the AND gates 108–112, the gating circuit 104 includes an exclusive OR circuit 118. The outputs of the AND gates 110 and 108 are connected to the inputs of the exclusive OR circuit 118 which, in turn, has its output connected to the shift right input of the shift register 78 in the generator 72 and to the up input of the counter 90. The output of the AND gate 112 is connected to the shift left input of the shift register 78 and to the down input of the counter 90. One output referred to hereihn as the "right enable" output is applied via a conductor 120 to one input of the AND gate 108. Another output of the flip flop 116 is connected to an AND circuit 122 and the inverse of the signal appearing on conductor 94 is applied to the other input of the AND circuit 122 by means of an inverter 124. This inverted signal is also applied to an enable input of the modulo N counter 102. The output of the AND circuit 122 is connected to the junction between a capacitor 126 and a resistor 128 of an RC circuit 129 and also to the input of a pulse generator 130. The output of the pulse generator is connected to the clear input of the modulo N counter 102.

The operation of the apparatus 10 is as follows: When the power is turned on the RC circuit 129 causes the pulse generator 130 to generate a pulse which is applied to the clear input of the modulo N counter. This starts the synchronization (sync) sequence. Transitions picked up by the sensors 48 and 50 traveling along the timing track 36 on the scale 14 will now be decoded by the quadrature decoder 80 which will then generate a forward timing or a reverse timing signal. These timing signals will count the modulo N counter 102 up or down depending on the direction of motion input. The forward or reverse timing signals from the quadrature decoder 80 will also be applied to either the shift right or the shift left input of the shift register 84. Accordingly, each time a timing signal counts the modulo N counter, the timing signal also shifts an information bit from sensor 52 or sensor 54 into the shift register 84.

After N counts in a row in either direction have been counted by the counter 102, a carry signal is generated which appears at the output 114. This carry signal indicates that N bits of data or information have been shifted into the N bit shift register 84. This is enough data to completely determine a position in the pseudo random binary sequence code. At this time the carry signal does three things: First, by reason of the connection of the output 114 to the load input of the shift register 78, the carry signal pre-sets the pseudo random binary sequence code generator 72 with the starting code sequence. Second, the carry signal pre-sets the up/down counter 90 with the absolute position value corresponding to the pseudo random binary sequence input to the code generator 72. Third, the carry signal sets the flip flop 116 and causes the same to generate a right enable signal which enables the clock signal through the AND gate 108. Since there is a "low" signal on the conductor 94 from the output of the comparator 86 to one input of the AND gate 110, there is a "low" output from the AND gate 110. Accordingly, with a "low" output and the clock signal being applied to the exclusive OR circuit or gate 118, the clock signal is passed through the OR gate 118 to the shift right input of the shift register 78. This clock signal now drives the pseudo random binary sequence code generator 72 and steps the up/down counter 90 up. The frequency of the clock signal is, of course, much higher than the frequency of the timing signals from the quadrature decoder 80. The shifting and counting will continue at a relatively fast rast on a one-to-one basis until equality is detected by the comparator 86 between the output of the register 84 and the output of the register 78. Equality will occur when the last N indicia-generated bits in the register 84 are equal to N bits of the pseudo random sequence cycled into the register 78 by the clock signals.

When equality has been detected by the comparator 86, an equal signal is applied via the conductor 94 to the gating circuitry 104 and to a re-set input of the flip flop 116 and removes the enable right signal which blocks passage of the clock signal through the AND gate 108, i.e. it disables the clock signal. Of course, the N bit shift register 84 has been tracking signals from the timing track 36 and the code track 38 via the output timing signal from the quadrature decoder 80 and the leading or trailing code inputs from the sensor 52 or 54. When equality has been established between the two N bit shift registers 84 and 78 by putting enough clock signals into the register 78 to cause the pseudo random binary sequence code generator to catch up to the data shifted into the shift register 84, the same number of clock signals have been applied to the up input of the up/down counter 90. Accordingly, the contents of the up/down counter 90 are now equal to the numerical value of the position of the sensing device 32 on the scale 14. In other words, the components of the apparatus 10 have essentially generated a number equal to the distance of the input code from the start code and added this distance to the absolute position represented by the start code.

Now that the outputs of the registers 84 and 78 are in sync, the apparatus 10 will continue to track the absolute position of the sensing device 32 on the scale 14. When the sensing device 32 moves, forward timing or reverse timing signals will be generated. These timing signals shift the leading or trailing code input from the leading or trailing code track sensor 52 or 54 into the left or right input of the N bit shift register 84. In addition, the AND gates 110 and 112 are enabled by the equal signal applied thereto such that timing signals are passed by the gating circuitry 104 to the register 78 and counter 90 to cycle or step the code generator 72 and counter 90 either forward or backward. As a result, the pseudo random binary sequence code generator 72 tracks the date input to the register 84 and the up/down counter tracks them both to provide an output signal indicative of the absolute position of the sensing device 32 mounted on the movable member 26.

If for some reason erroneous data is shifted into the shift register 84, the comparator 86 will no longer detect equality and will no longer provide an equal signal. With equality the right enable output of flip flop 116 is "low", the other output from flip flop 116 to the AND circuit 122 is "high" and the second input to the AND circuit 122 is "low" by reason of the inversion of the "high" equal signal by the inverter 124. When equality is lost, the inverter 124 has a "low" input and then applies a "high" signal to the AND circuit 122 which then applies an output signal to the RC circuit 129 and the pulse generator 130. When this output signal exists for a predetermined time period established by the RC circuit 129, the pulse generator 130 is operated to apply a "lost-sync" signal to the clear input of the modulo N counter 102 which will start the operation of the apparatus 10 as described above. The apparatus 10 will now proceed to resynchronize itself in the manner described above.

Figure 10:
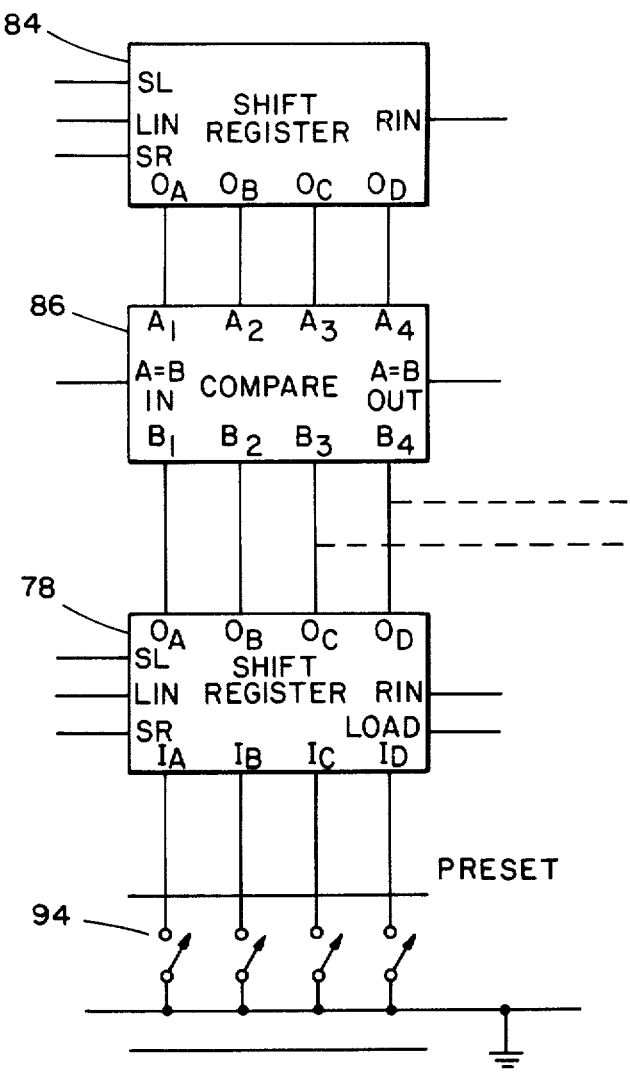
FIG. 10 is an enlarged fragmentary circuit diagram of portions of the circuit shown in FIG. 9 and is taken along line 10—10 of FIG. 9.
Figure 10:
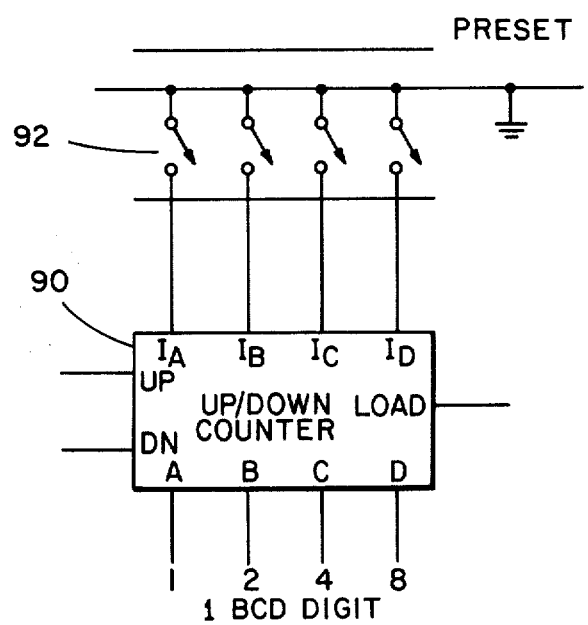

FIG. 10 is a typical 4-bit (BIN or BCD) slice through the shift register 84, the comparator 86, the shift register 78, the pre-set network 94, the pre-set network 92 and the counter 90. As shown, the networks 92 and 94 comprise an array of switches for generating code pre-set data. In one embodiment of the apparatus 10, the remaining components shown in FIG. 10 were as follows:

| Component | Manufacturer |
| --- | --- |
| Shift register 84 | Texas Instruments SN74194 |
| Comparator 86 | Texas Instruments SN7485 |
| Shift register 78 | Texas Instruments SN74194 |
| Up/down counter 90 | Texas Instruments SN74192 |

The output information from the counter 90 can be used in many different ways, for example, the output information could be applied to the visual display device 34, to a machine control device, to programmable limit switches or to programmable event generators. Also, the apparatus 10 permits the monitoring of the absolute position of a tool, e.g. tool 28, and the possibility of predicting future positions of the tool 28. Additionally, the output information from the counter 90 can be utilized to determine velocity and acceleration of a movable element, e.g. toolpost 26.

Although the embodiment of apparatus 10 described above is preferred, the apparatus 10 can be modified by eliminating the control circuit 88 and substituting an N bit storage memory for the register 78. A particular N bits of a pseudo random sequence are then stored in the memory and connected to the comparator 86. In operation, when the N indicia-generated bits in the register 84 equal the pre-set N bits in the memory, a control signal is generated which can be utilized to stop movement of the movable element. Such a modification can be utilized for driving the machine tool 12 until the toolpost 26 has reached a desired limit of travel and then stopping operation of the maching tool 12.

From the foregoing description it is readily apparent that the method and apparatus of the invention provide a number of advantages, some of which have been described above and others of which are inherent in the invention. Also, obvious modifications and variations can be made in the method and to the apparatus without departing from the teachings of the present invention. Accordingly, the scope of the invention is only to be limited as necessitated by the accompanying claims.

I claim:

1. Method for determining the absolute position of a movable element mounted for movement along a path, said method including the steps of: developing a pseudo random sequence of indicia which uniquely define the position of the movable element on the path; generating a pseudo random sequence of information bits which correspond to the indicia; reading the pattern of N consecutive indicia at one particular position on the path as the movable element passes by said position; cycling the generated pseudo random sequence until N bits thereof equal the pattern of the N consecutive indicia read as the movable element passes by said position on the path; and when equality is obtained, generating a logic signal indicating that the pseudo random sequence has been cycled to a position correlated to the absolute position of the movable element on the path.

2. The method according to claim 1 including the steps of: thereafter reading a subsequent pattern of N inicia in synchronism with movement of the movable element, comparing a subsequent sequence of N bits of the pseudo random sequence with the subsequent pattern of N indicia to assure the accuracy in the determination of the position of the movable element, and, when a discrepancy is discovered, cycling the pseudo random sequence until N bits thereof equal a subsequent pattern of N indicia and then generating a new logic signal indicating that the pseudo random sequence has been cycled to a position correctly correlated to the absolute position of the movable element on the path.

3. The method according to claim 1 wherein the indicia are developed along the path.

4. The method according to claim 1 wherein said cycling of the pseudo random sequence can be accomplished in a forward direction or in a reverse direction.

5. The method according to claim 1 wherein the path is linear.

6. The method according to claim 1 wherein the movable element is mounted on a machine tool and the path is situated on a bed of the machine tool.

7. The method according to claim 6 wherein the path is linear.

8. The method according to claim 1 including the step of counting in synchronism with said cycling of pseudo random sequence of information bits and wherein the logic signal is operative to stop said cycling and said counting thereby to stop the count at a number related to the numerical value of the absolute position of the movable element on the path.

9. The method according to claim 1 wherein the indicia includes a timing track of indicia and a code track of indicia.

10. The method according to claim 9 wherein said step of reading the pattern is accomplished by reading the code on the code track at timed intervals determined by readings of indicia on the timing track.

11. The method according to claim 10 wherein said step of reading the pattern of indicia includes determining, from readings of the code track in conjunction with readings of the timing track, whether the movable element is moving in a forward direction or a reverse direction on the path.

12. The method according to claim 1 including the step of controlling the cycling of said pseudo random sequence, said controlling including preventing said cycling until the pattern of indicia read includes N indicia.

13. Apparatus for determining the absolute position of a movable element mounted for movement along a path, said apparatus including generating means for generating a pseudo random sequence of information bits, a scale associated with the movable elements and the path and having indicia thereon related to particular positions along the path and corresponding to pseudo random sequence of information bits, means associated with the movable element and the path for reading the indicia as the movable element moves along the path and for generating a signal which comprises a particular sequence of N information bits correlated to N indicia just read by said reading and generating means, comparing means coupled to said first generating means and to said reading and generating means for comparing N bits of said pseudo random sequence of information bits with said signals, and cycling means for cycling said pseudo random sequence of information bits in said generating means until equality is obtained in the comparison between said signal and an N bit portion of said pseudo random sequence of information bits in said generating means, said comparing means being operative when equality is obtained to generate a logic signal indicating that the position of said pseudo random sequence of information bits in said generating means is in a position correlated to the absolute position of the movable element on the path.

14. The apparatus according to claim 13 including a counter, said cycling means being coupled to said counter to step said counter in synchronism with the cycling of said pseudo random sequence in said generating means and said logic signal being applied to said cycling means to stop operation of same when equality is obtained thereby causing said counter to contain a number directly related to the absolute numerical value of the scale position of the movable element on the path.

15. The apparatus according to claim 14 wherein said counter is an up/down counter.

16. The apparatus according to claim 15 including a visual display device coupled to said counter for displaying a numerical value which is related to the number in said counter and which indicates the absolute position of the movable element on the path.

17. The apparatus according to claim 13 wherein said generating means is a bidirectional pseudo random sequence generator and includes an N bit shift register, an exclusive OR feed back network coupled to the left input of said shift register, an exclusive OR feed forward network coupled to the right input of said shift register and coupling between said networks, said shift register being coupled to said comparing means.

18. The apparatus according to claim 13 wherein said indicia are situated along the path.

19. The apparatus according to claim 13 wherein the path is linear.

20. The apparatus according to claim 13 wherein the movable member is mounted on a machine tool and the path is situated on a bed of said machine tool.

21. The apparatus according to claim 13 wherein said indicia comprise timing markings on a timing track and code markings on a code track aligned with said timing track.

22. The apparatus according to claim 21 wherein said reading and generating means includes a sensing device movable along said tracks and having means for sensing said timing markings and means for sensing said code markings.

23. The apparatus according to claim 22 wherein said timing markings and code markings are formed of light passing and light blocking segments on said tracks and said two sensing means of said sensing device comprise aligned light generating elements and light sensing elements disposed on opposite sides of said tracks.

24. The apparatus according to claim 22 wherein said timing marking sensing means includes first and second sensors, said timing track includes repetitive cycles of logic one-logic zero markings and said second sensor is displaced from said first sensor a distance such that when said first sensor is at the beginning of a cycle said second sensor is displaced 90° from one end of a cycle whereby a strobe signal is generated by one of said sensors each 90° of travel of said sensing device through a cycle of said timing markings and the relative logic states of said sensors can be utilized to determine the direction of travel of the movable member.

25. The apparatus according to claim 24 wherein said code marking sensing means include a forward direction sensor and a reverse direction sensor.

26. The apparatus according to claim 22 wherein said reading and generating means includes a quad decoder operable to determine from timing signals received from said timing track sensing means whether the movable member is moving in the forward direction or the reverse direction.

27. The apparatus according to claim 26 wherein said reading and generating means includes an N bit shift register coupled to the output of said quad decoder and to said code track sensing means.

28. The apparatus according to claim 27 wherein said reading and generating means includes a modulo N counter which is coupled between the output of said quad decoder and said cycling means and which is operable to prevent cycling of said pseudo random sequence in said generating means until N bits of indicia-generated information bits are stored in said N bit shift register.

29. The apparatus according to claim 28 wherein said cycling means includes gating circuit means coupled between the output of said quad decoder and an input to said generating means, said logic signal being applied to said gating circuit means and being operative to disable said gating circuit means to stop cycling of said generating means.

30. The apparatus according to claim 29 wherein said cycling means includes lost-sync circuit means which are coupled between an output of said modulo N counter and a "clear" input of said modulo N counter and which are coupled between said output of said modulo N counter and an input of said gating circuit means, said lost-sync circuit means being operable, after equality has been lost for a predetermined period of time, to clear said modulo N counter and disable said gating circuit means, and thereby said cycling means, until a new sequence of N indicia-generated information bits are stored in said N bit shift register, after which said gating circuit means is enabled to cause cycling of said pseudo random sequence until equality is again obtained.

31. The apparatus according to claim 26 wherein said cycling means includes gating circuit means coupled between the output of said quad decoder and an input to said generating means, said logic signal being applied to said gating circuit means and being operative to disable said gating circuit means to stop cycling of said generating means.

32. Method for determining when a movable element has reached a predetermined position along a path, including the steps of: developing along the path a pseudo random sequence of indicia which uniquely define the position of the movable element on the path; memorizing N bits of a pseudo random sequence of information bits which corresponds to the pseudo random sequence of indicia, the N bits corresponding to and identifying a particular position along the path; reading the indicia as the movable element moves along the path; generating a changing signal which comprises N information bits correlated to the N indicia just read; comparing the memorized N bits with the changing signal; and, generating a logic signal when equality is obtained between the memorized N bits and the N indicia-generated bits, said logic signal indicating that the movable element is at a predetermined position on the path.

33. Apparatus for determining when a movable element has reached a predetermined position along a path, said apparatus comprising a memory, N bits of a pseudo random sequence of information bits being stored in said memory, a scale which is associated with the movable member and the path and which has a pseudo random sequence of indicia thereon corresponding to said pseudo random sequence of information bits, means associated with the movable element and the path for reading said indicia as the movable element moves along the path and for generating a changing signal which comprises N information bits correlated to the N indicia just read by said reading and generating means, and comparing means coupled to said memory and to said reading and generating means, said comparing means being operative to generate a logic signal when equality is reached between said N bits stored in said memory and the N bits received from said reading and generating means to indicate that the movable element is at the predetermined position on the path.

* * * * *